United States Patent [19]

Basurto et al.

[11] 4,305,003
[45] Dec. 8, 1981

[54] ENERGY GENERATION SYSTEM

[76] Inventors: Arturo G. Basurto, Caracas 339, Fraccionamiento Valle Dorado Tlanepantla Edo. Mexico, Mexico City; Carlos C. B. Ibarra, Retorno de Calle de la Rivera #12, Lomas de Bellavista Cd. Satélite; Dario D. G. Velázquez, Palestina 106 Col. Claveria, Mexico City 16, all of Mexico

[21] Appl. No.: 134,911

[22] Filed: Mar. 28, 1980

[51] Int. Cl.³ .............................................. F03B 13/06
[52] U.S. Cl. .......................................... 290/54; 60/497
[58] Field of Search ...................... 290/43, 54, 42, 53; 60/495, 497, 502, 639, 503, 505–507, 398

[56] References Cited

U.S. PATENT DOCUMENTS 3,487,228 12/1969 Kriegel .................................. 60/497
4,034,565 7/1977 McVeigh ............................. 60/507

FOREIGN PATENT DOCUMENTS 2282544 3/1976 France .................................. 60/497

Primary Examiner—J. V. Truhe
Assistant Examiner—Shelley Wade
Attorney, Agent, or Firm—William W. Haefliger

[57] ABSTRACT

A power producing system employs floats that move up or down in tanks that may be located wherever desired, to produce power.

15 Claims, 7 Drawing Figures

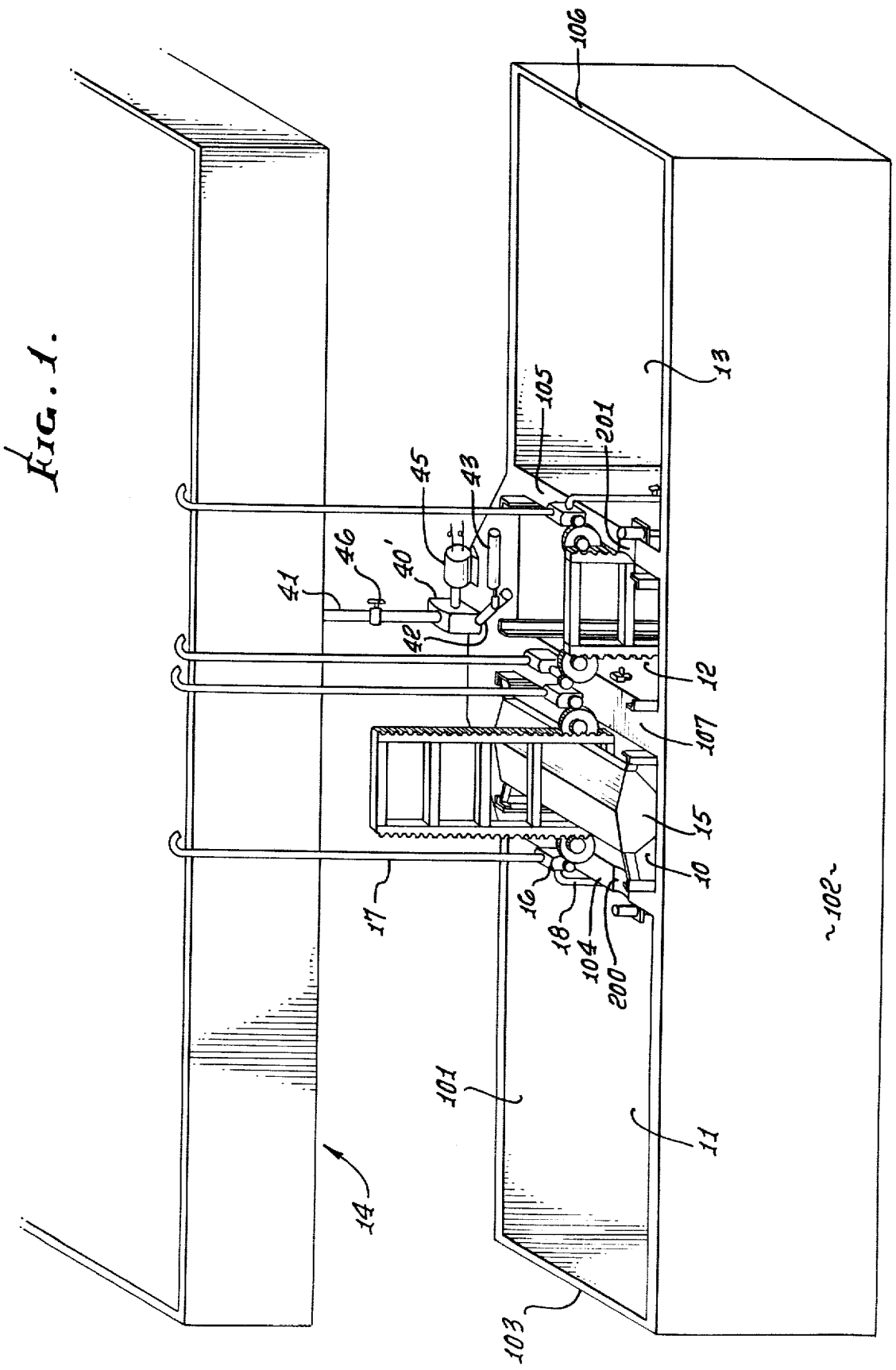

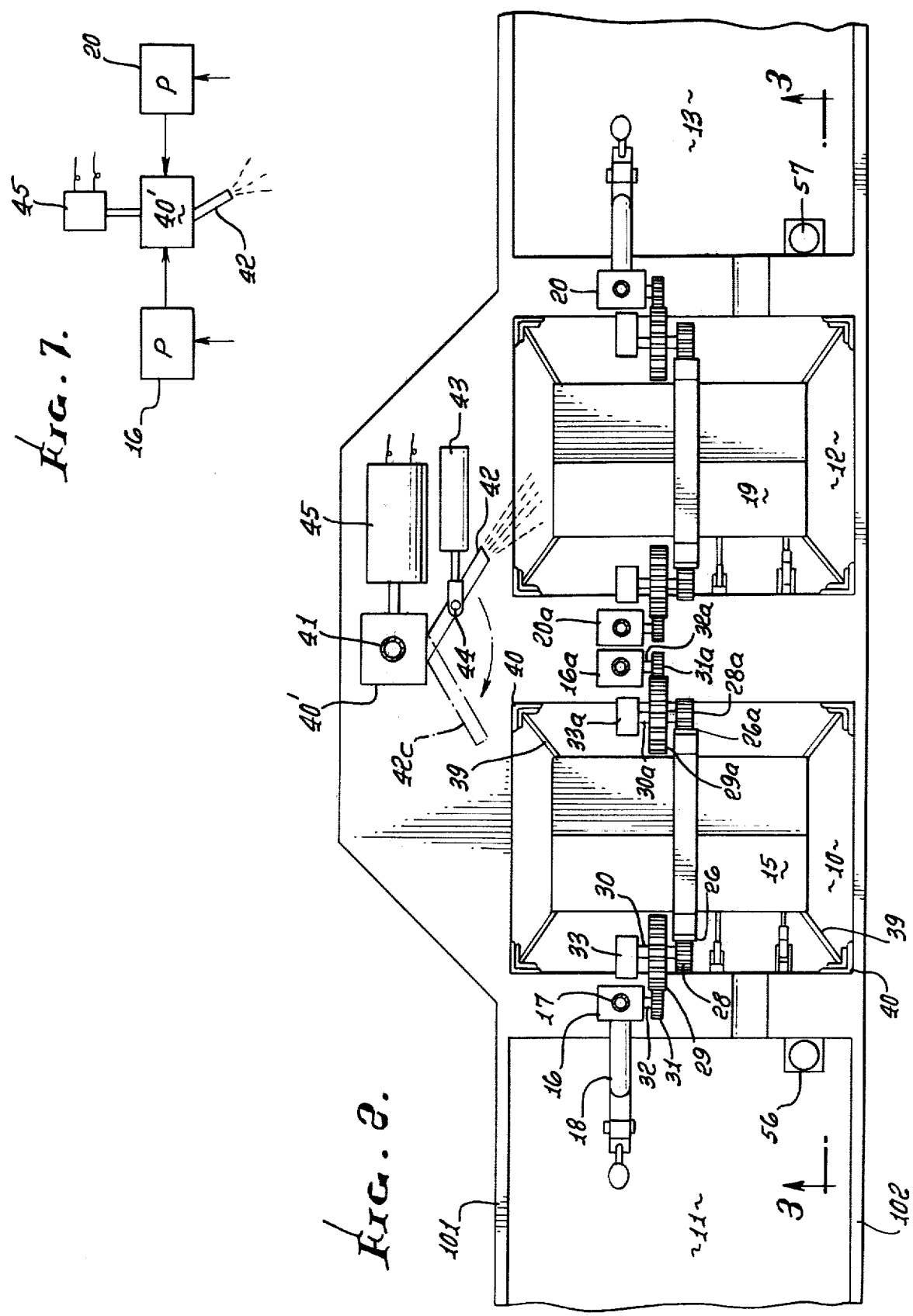

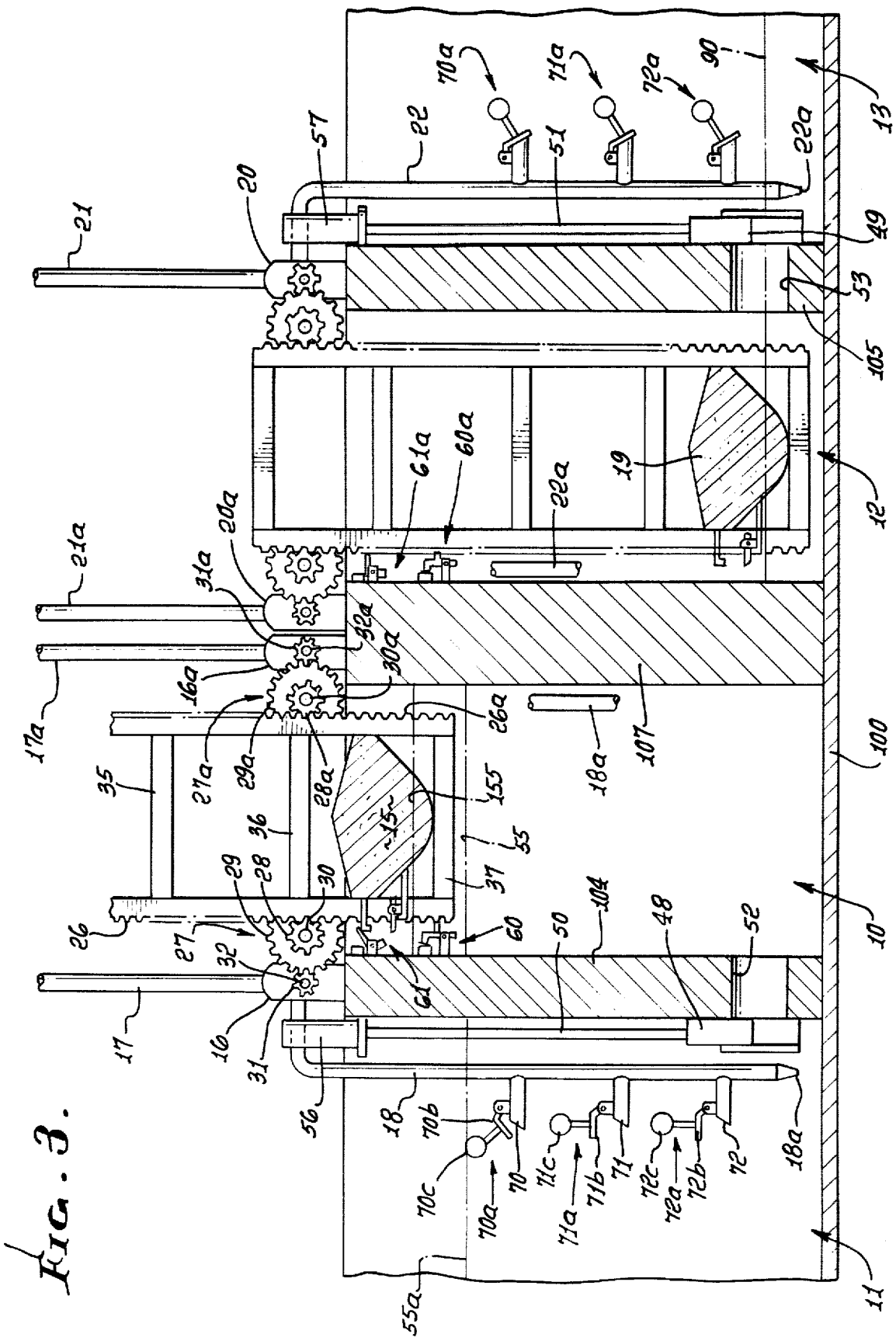

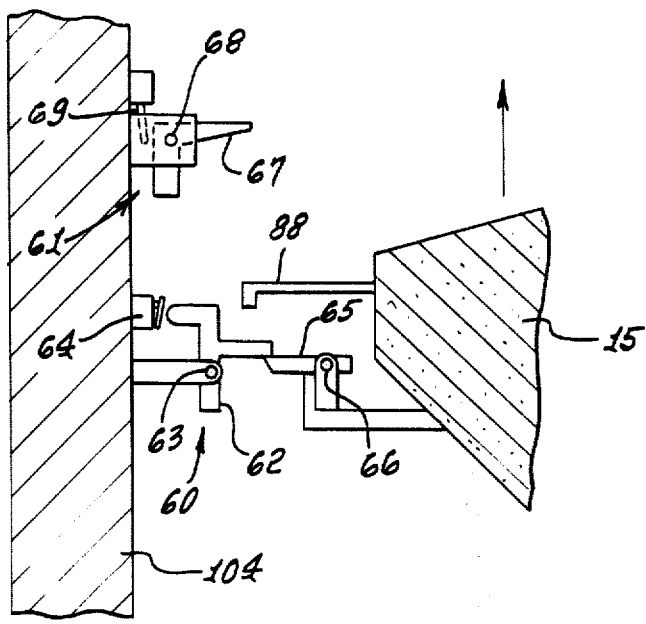
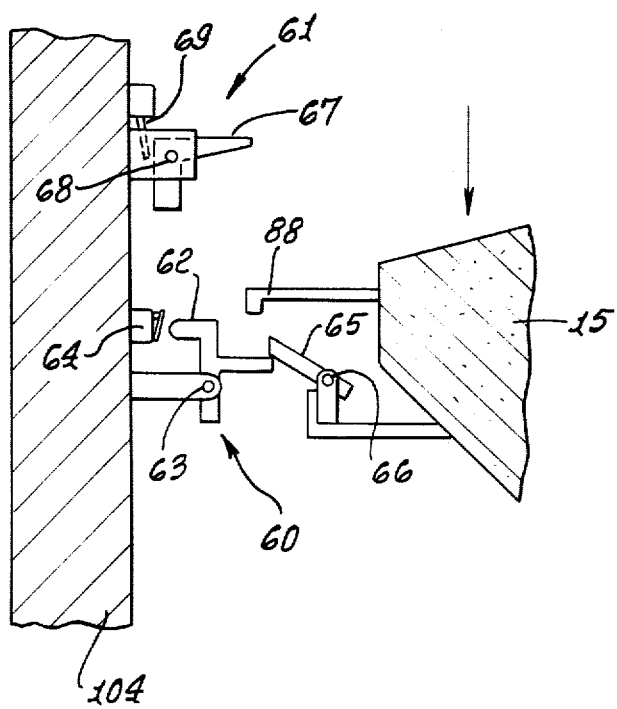
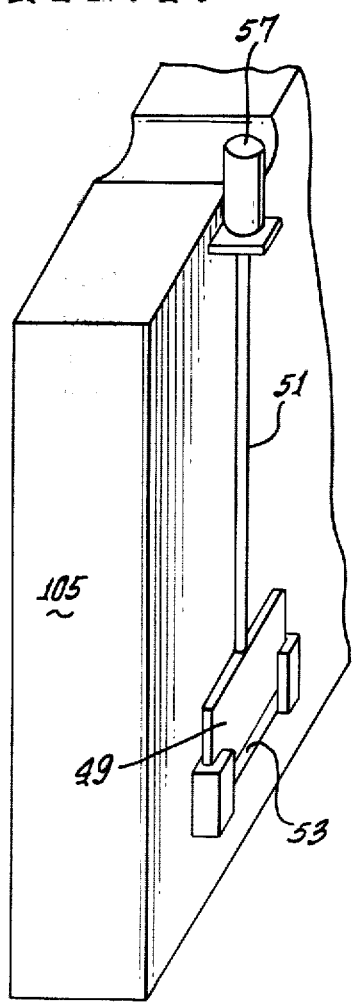

ENERGY GENERATION SYSTEM

BACKGROUND OF THE INVENTION

This invention relates generally to power generation, and more particularly concerns the employment of liquid potential and kinetic energy to produce power.

There is a continuing need for simple, effective apparatus to produce power, such as electrical power, at selected locations such as at remote houses or villages. In the past, it was proposed to employ the rising and falling of ocean tides to drive power producing apparatus; however, the location of such apparatus is necessarily restricted to ocean shore sites and such apparatus was of large scale and expensive.

SUMMARY OF THE INVENTION

It is a major object of the invention to provide a power producing system that employs floats moving up or down in tanks that may be located wherever desired to produce power. The tanks and floats may be of selected size to correspond to desired power output at the chosen location; also, the system is extremely simple. As will be seen, it basically comprises:

(a) first and second tanks to receive liquid, (b) a primary float in the first tank to be elevated as the level of liquid in the first tank rises, and to be lowered when the level of liquid in the first tank falls, (c) a primary pump coupled to the float to pump liquid from the second tank in response to float movement vertically in the first tank, and (d) primary means to generate energy in response to the flow of liquid to the first tank or from the second tank.

As will be seen, a primary valve may be employed to pass liquid from the first tank to the second tank; and a primary control may be coupled to the valve and located to sense elevation of the float to close the valve when the float arrives at a first predetermined elevation, and to open the valve when the float arrives at a second and higher elevation. Accordingly, the water leaving the first tank will drop below the level of the elevated float, allowing full weight application of the float to the drive to the pump or pumps as the float descends, for maximum power output.

It is another object of the invention to provide third and fourth tanks, and a secondary float movable up and down in the third tank in the same manner as described for the primary float in the first tank; however, the two floats move up and down in alternation for producing continuous power output.

It is a further object to provide an elevated tank to receive water or liquid pumped from the second and fourth tanks, and to supply liquid to the first and third tanks in alternation, and via a turbine that drives a power generator, whereby generation of power is achieved without interruption caused by up and down float movement; also, liquid can be supplied to the elevated tank from other sources.

As will be seen, units incorporating the invention can be installed wherever desired; waste liquid such as water may be employed; and speed control can be achieved to vary or control power output, in a simple manner.

These and other objects and advantages of the invention, as well as the details of an illustrative embodiment, will be more fully understood from the following description and drawings, in which:

DRAWING DESCRIPTION

FIG. 1 is an elevation in perspective showing a system incorporating the invention;

FIG. 2 is a plan view of the FIG. 1 system;

FIG. 3 is an elevation, in section, showing the system;

FIG. 4 is a fragmentary perspective showing a gate valve as used in the FIGS. 1-3 system;

FIG. 5 is an enlarged view showing the operation of a float elevation sensor, during using of a float;

FIG. 6 is a view similar to FIG. 5, showing operation of a float elevation sensor during descent of a float; and FIG. 7 is a flow diagram showing a modified system.

DETAILED DESCRIPTION

Referring first to FIGS. 1-3, they show first and second tanks 10 and 11 to receive liquid, and third and fourth tanks 12 and 13 to also receive liquid. Such liquid may for example consist of water. The tanks include a common bottom wall 100, common side walls 101 and 102, and transverse walls 103-107. In addition, and in this form of the invention, an upper tank 14 is also provided, to hold liquid at a higher elevation, for alternate supply to the first and third tanks 10 and 12.

Referring now to tanks 10 and 11, a primary float 15 is provided in the first tank 10, to be elevated as the level of liquid in that tank rises, and to descend or to be lowered, as for example by gravity, when the level of liquid in tank 10 falls. See liquid level 55 (for example) in FIG. 3, which has fallen below the float 15. A primary pump 16 associated with tanks 10 and 11 is coupled to float 15 to pump liquid from the second tank 11 in response to float movement vertically (as for example downwardly) in tank 10. Pump 16 typically pumps liquid from the second tank 11 to be returned upwardly to the supply tank 14 as via duct 17. The intake duct for the pump is indicated at 18, and projects downwardly into the second tank 11, as shown in FIG. 3. The lower intake end 18a of the duct 17 is of reduced area, as shown.

In similar manner, and with reference to tanks 12 and 13, a secondary float 19 is provided in the third tank 12, to be elevated as the level of liquid in that tank rises, and to descend or to be lowered, as for example by gravity, when the level of liquid in tank 12 falls. A secondary pump 20 associated with tanks 12 and 13 is coupled to float 19 to pump liquid from the fourth tank 13 in response to float movement vertically (as for example downwardly) in tank 11. Pump 20 typically pumps liquid from the fourth tank 13 to be returned upwardly to a supply tank (which may be part of or the same as, tank 14, or separate from tank 14) as via duct 21. The intake duct for pump 20 is indicated at 22, and projects downwardly into the fourth tank 13, as shown in FIG. 3. The lower intake end 22a of duct 21 is reduced in area, as shown.

Auxiliary pumps, corresponding to pumps 16 and 20, are shown at 16a and 20a in FIG. 3; pump 16a may have its intake connected with an auxiliary pipe or duct 18a in tank 10; and pump 20a may have its intake connected with an auxiliary pipe or duct 22a in tank 12. Ducts 18a and 22a are like ducts 18 and 22. Pumps 16a and 20a discharge via auxiliary ducts 17a and 21a to upper tank or tanks 14.

The coupling of the primary float 15 to primary pumps 16 and 16a may advantageously include gearing represented by vertical racks 26 and 26a integral with float 15, and gear trains 27 and 27a. The train 27 includes small spur gear 28 (meshing with rack 26) integral with larger spur gear 29 and having a common shaft 30, and small spur gear 31 (meshing with large spur gear 29) and mounting on the pump drive shaft 32. Similar elements 28a, 29a, 30a, 31a and 32a are included in gear train 27a. Supports for shafts 30 and 30a appear at 33 and 33a, in FIG. 2. Such gearing provides rapid rotation of the pump impellers in response to slow descent of the float 15. The float 15 is cradled between the vertical racks, and cross-beams 35–37 interconnect the racks. FIG. 2 shows corner guides 38 connected to the float via braces 39 to loosely interfit the tank corners 40, to center the rack and float assembly in tank 10. Similar gearing and guide elements are shown in association with float 19 in third tank 12, whereby pumps 20 and 20a are similarly operated. Note, however, that as float 15 rises, float 19 descends, and vice versa.

In this regard, primary means is provided to generate energy (as for example electrical energy) in response to the flow of liquid to the first tank 10 causing float 15 to rise in that tank. Such means may comprise a turbine 40' located in series with duct 41 receiving liquid discharging from upper tank 14, to be driven by such downward liquid flow. The liquid discharged from the turbine flows via discharge duct 42 to tanks 10 and 11 in alternation. Thus, an actuator 43 is coupled at 44 to discharge duct 42 to displace the duct between a primary position (see broken lines 42a in FIG. 2) in which liquid is discharged to the first tank, and a secondary position (see full lines 42 in FIG. 2) in which liquid is discharged to the third tank 12. The actuator is operated to swing duct 42 to primary position in response to arrival of tank 19 at full up position, and to swing duct 42 to secondary position in response to arrival of tank 15 at full up position. Electrical generator 45 is driven by turbine 40. A control valve 46 in series with duct 41 controls the flow of liquid to the turbine and to the tanks, to provide system ON-OFF control, as well as the operating rate or speed. For example, if more electrical power output is required, valve 46 is opened further, and vice versa.

Also provided is a primary control valve 48 to pass liquid from the first tank to the second tank when the valve is opened, allowing outflow of liquid from the first tank to tank 11 faster than the float 15 then descends from uppermost (see FIG. 3) whereby the full weight of the float is applied to drive the pumps 16 and 16a to pump liquid from receiver tank 11 to upper tank 14. Similarly, a secondary control valve 49 is provided to pass liquid from the third tank to the fourth tank when the valve 49 is opened, allowing emptying of liquid from the third tank to tank 13 faster than float 19 then descends from its alternate uppermost position, whereby the full weight of that float is applied to drive the pumps 20 and 20a to pump liquid from tank 13 and also 12 to upper tank 14. Valves 48 and 49 may comprise gate valves, as shown, which are vertically movable on rods 50 and 51 to control ports 52 and 53 through transverse tank walls 104 and 105, respectively.

Ports 52 and 53 are located near the bottoms of walls 104 and 105, and are sized to rapidly pass liquid from tank 10 to tank 11, and from tank 12 to tank 13. In FIG. 3, the valve 48 has just been opened, and the liquid level 55 has fallen away from the float 15 as water surges through port 52 to tank 11, creating equal elevation level 55a in tank 11. Solenoids 56 and 57 are connected to rods 50 and 51, to operate the valves. The highest water level attained in tank 10 is indicated at 155.

A further aspect of the invention concerns the provision of a primary control operatively connected with the valve, and located to sense the elevation of the float to effect closing of the valve when the float arrives at a first predetermined elevation, and to effect opening of the valve when the float arrives at a second predetermined elevation higher than said first elevation. This allows the liquid level in the first tank 10, for example, to rise higher than the liquid level in the second tank as the float nears its highest elevation, so that when the valve is subsequently opened, the liquid level will suddenly fall clear of the float, allowing the full float weight to be coupled to the pumps 16 and 16a for driving same as the float then descends, at which time the pumps are operated to pump down the liquid in tanks 10 and 11. In this regard, the float or floats may contain ballast to increase their weight for increasing the power input to the pumps.

The described control typically includes first and second float elevation sensors at two positions corresponding to float first and second elevations, as described. See for example sensors 60 and 61 in FIGS. 5 and 6. Sensor 60 includes a bracket 62, pivoted at 63, to be pivoted counterclockwise to operate switch 64 when an arm 65 on float rises to engage bracket 62 in FIG. 5. Arm 65 is pivoted at 66, and spring urged, to clear the bracket as the float falls. Switch 64 operates the valve solenoid 56 to close the gate valve 48. Sensor 61 includes a bracket 67 pivoted at 68, to be pivoted counterclockwise to operate switch 69 when arm 88 on the float rises to engage bracket 67, in FIG. 5. Switch 69 operates solenoid 56 to open the gate valve 48; also, it operates actuator 43 to swing the discharge duct 42, as described. When float 15 descends, the arm 65 pivots to clear bracket 62, as shown in FIG. 6. Similar control elements associated with the float 19 in tank 12, and are labeled as sensors 60a and 61a, in FIG. 3.

It will be noted that the second tank 11 is substantially larger in horizontal cross sections than first tank 10; and that the fourth tank 13 is substantially larger in horizontal cross-section than third tank 12. This allows the highest water level in tank 10, for example, to drop substantially and rapidly below the float 15 (as the water level 55a in tank 11 rises) when the valve 48 is opened.

FIG. 3 also shows that intake pipe 18 (for pump 16) has multiple side inlets, as at 70–72, at different elevations, to facilitate liquid entry into that pipe for suction to the pump inlet, with minimum energy loss. Float controlled valves 70a—72a control those inlets to open them when the liquid level rises above the inlets, and to close them when the liquid level drops below those inlets. See for example pivoted flappers 70b—72b, and floats 70c—72c attached to the flappers.

Similar float controlled inlets are provided for inlet pipe 22, and also pipes 18a and 22a.

It will be understood that the pumps may be coupled to the floats so as to be operated as the floats rise, rather than as the floats descend.

Overflow passages 200 and 201 are formed in the tops of walls 104 and 105, to pass liquid such as water from tanks 10 and 12 into tanks 11 and 13, respectively, in the event the valves do not open as required.

In operation, electrical or other power is continuously generated and liquid is continuously pumped to upper tank 14, due to the alternate up and down operation of the floats. In this regard, the up-strokes of the floats may be suitably decoupled from the pumps, as by one-way ratchet or clutch coupling to the pump impellers, such couplings located within the pump housings, or may be associated with the described gearing. More than two float tanks may be employed, as for example three floats in three tanks, the floats rising and falling in 120° phase separations.

The invention enables the use of various liquids such as waste water, etc., to drive the floats up and down. Tanks and electrical generators of different sizes may be employed, to corresponds to power requirements. The use of such tanks enables system installations at various locations, providing, for example, satellite generating stations. The floats may be with or without ballast.

We claim:

1. In energy generating apparatus, the combination comprising
   (a) first and second tanks to receive liquid,
   (b) a primary float in the first tank to be elevated as the level of liquid in the first tank rises, and to be lowered when the level of liquid in the first tank falls,
   (c) a primary pump coupled to the float to pump liquid from the second tank in response to float movement vertically, in the first tank, and
   (d) primary means to generate energy in response to the flow of liquid to the first tank,
   (e) and an upper tank at a higher elevation than said first and second tanks, to receive liquid pumped from the second tank as well as liquid supplied from another source, and to supply liquid to flow to the first tank.

2. The combination of claim 1 including a primary valve to pass liquid from the first tank to the second tank when the valve is opened, and a primary control operatively connected with the valve and located to sense the elevation of the float to effect closing of the valve when the float arrives at a first predetermined elevation, and to effect opening of the valve when the float arrives at a second predetermined elevation which is higher than said first elevation.

3. The combination of claim 2 wherein said control includes first and second float elevation sensors at two positions corresponding to said first and second float elevations.

4. The combination of any of claims 1-3 including gearing coupling the float to said pump, the gearing including a rack movable up and down with the float, and rotary gearing coupling the rack to the pump.

5. The combination of claim 2 wherein said (d) means includes a turbine located to be driven by liquid flow from the upper tank to the first tank, and an electrical generator coupled to said turbine.

6. The combination of claim 5 including a liquid flow duct extending between the upper tank and the turbine, and a control valve in series with said duct.

7. The combination of claim 5 including
   (e) third and fourth tanks to receive liquid,
   (f) a secondary float in the third tank to be elevated as the level of liquid in the third tank rises and to be lowered as the level of liquid in the third tank falls,
   (g) a secondary pump coupled to the secondary float to pump liquid from the fourth tank in response to secondary float movement vertically in the third tank, and
   (h) said primary means to generate energy being operable in response to flow of liquid to the third tank,
   (i) said upper tank located to receive liquid pumped from the fourth tank, and to supply liquid to the third tank.

8. The combination of claim 7 including a secondary valve to pass liquid from the third tank to the fourth tank when the valve is opened, and a secondary control operatively connected with the secondary valve and located to sense the elevation of the secondary float to effect closing of the secondary valve when the secondary float arrives at a first predetermined elevation, and to effect opening of the secondary valve when the secondary float arrives at a second predetermined elevation which is higher than said first elevation.

9. The combination of claim 7 wherein said secondary control includes first and second float elevation sensors at two positions corresponding to said first and second secondary float elevations.

10. The combination of any of claims 7-9 including gearing coupling the secondary float to said secondary pump, the gearing including a rack movable up and down with the secondary float, and rotary gearing coupling the rack to the secondary pump.

11. The combination of claim 7 wherein said turbine has a liquid discharge which is alternately supplied to said first and third tanks to effect alternating elevation of the primary and secondary floats in said tanks.

12. The combination of claim 11 including an actuator coupled to a turbine discharge duct to displace said duct between a primary position in which liquid is discharged to the first tank, and a secondary position in which liquid is discharged to the third tank.

13. The combination of claim 1 including a primary valve to drain liquid from the first tank to the second tank when the valve is opened, and means coupling the float to the pump for enabling the pump in its operation to resist descent of the float as the level of the draining liquid in the first tank falls beneath the primary float, whereby the full weight of the descending float acts to drive the pump.

14. The combination of claim 8 or any of claims 11-13 including a secondary valve to drain liquid from the third tank to said fourth tank when the secondary valve is open, and means coupling the secondary float to the secondary pump for enabling that pump in its operation to resist descent of the secondary float as the level of the draining liquid in the third tank falls beneath the secondary float, whereby the full weight of the descending secondary float acts to drive the secondary pump.

15. The combination of claim 1 wherein said primary pump has an intake, and including an intake pipe connected to said intake, and extending downwardly in the tank, said intake pipe having multiple inlets at different elevations, there being float controlled valves controlling said inlets.

* * * * *